United States Patent
Lee et al.

(10) Patent No.: US 9,157,723 B2
(45) Date of Patent: Oct. 13, 2015

(54) ABSOLUTE DIAMETER MEASUREMENT ARM

(71) Applicant: Axiam, Inc., Gloucester, MA (US)

(72) Inventors: Robert M. Lee, Magnolia, MA (US); Robert E. Parsons, Gloucester, MA (US)

(73) Assignee: Axiam, Inc., Gloucester, MA (US)

( * ) Notice: Subject to any disclaimer, the term of this patent is extended or adjusted under 35 U.S.C. 154(b) by 178 days.

(21) Appl. No.: 14/083,162

(22) Filed: Nov. 18, 2013

(65) Prior Publication Data

US 2014/0096405 A1     Apr. 10, 2014

Related U.S. Application Data

(63) Continuation-in-part of application No. 14/010,197, filed on Aug. 26, 2013, now abandoned, which is a continuation of application No. 13/491,035, filed on Jun. 7, 2012, now Pat. No. 8,538,725, which is a continuation of application No. 12/695,304, filed on Jan. 28, 2010, now Pat. No. 8,219,353.

(60) Provisional application No. 61/148,857, filed on Jan. 30, 2009.

(51) Int. Cl.
*G01B 5/08*     (2006.01)
*G01B 21/10*    (2006.01)
*G01B 11/08*    (2006.01)

(52) U.S. Cl.
CPC  *G01B 5/08* (2013.01); *G01B 11/08* (2013.01); *G01B 21/10* (2013.01)

(58) Field of Classification Search
CPC ............ G01B 5/08; G01B 5/12; G01B 5/004; G01B 5/008
USPC .......................................... 33/502, 1 CC, 503
See application file for complete search history.

(56) References Cited

U.S. PATENT DOCUMENTS

| 4,131,387 A | 12/1978 | Kazin et al. | |
|---|---|---|---|
| 4,255,862 A * | 3/1981 | Nakamura | 33/503 |
| 4,369,581 A * | 1/1983 | Lenz | 33/1 M |

(Continued)

FOREIGN PATENT DOCUMENTS

| EP | 1 467 063 A1 | 10/2004 |
|---|---|---|
| GB | 2 423 341 A | 8/2006 |

OTHER PUBLICATIONS

Axiam Incorporated Product Brochure of GMX 4000 Smart Stack™ Systems, "For Assembly of Aircraft Jet Engines and Industrial Gas Turbines" (1991).

(Continued)

*Primary Examiner* — Christopher Fulton
(74) *Attorney, Agent, or Firm* — Hamilton, Brook, Smith & Reynolds, P.C.

(57) ABSTRACT

A measurement apparatus and corresponding method can be used to measure an absolute diameter of a part in a shop floor environment. A tracker such as a laser tracker monitors a position of a probe end of a measurement arm of the apparatus. The position measured by the laser tracker can be used directly account for errors in the apparatus such as, for example, positioning errors of the measurement arm. The position monitoring of the tracking device eliminates complex apparatus calibrations and calculations used for previous devices.

19 Claims, 6 Drawing Sheets

(56) References Cited

U.S. PATENT DOCUMENTS

| | | | | |
|---|---|---|---|---|
| 4,428,126 | A | 1/1984 | Banks | |
| 4,538,455 | A | 9/1985 | Klufas | |
| 4,574,199 | A * | 3/1986 | Pryor | 250/559.33 |
| 4,585,379 | A | 4/1986 | Nagayama et al. | |
| 4,691,446 | A * | 9/1987 | Pitches et al. | 33/516 |
| 4,709,485 | A | 12/1987 | Bowman | |
| 4,777,818 | A * | 10/1988 | McMurtry | 73/1.79 |
| 5,111,590 | A * | 5/1992 | Park | 33/502 |
| 5,373,922 | A | 12/1994 | Marra | |
| 5,400,638 | A | 3/1995 | Kim | |
| 5,414,929 | A | 5/1995 | Flöser et al. | |
| 5,537,861 | A | 7/1996 | Seitelman et al. | |
| 5,538,258 | A | 7/1996 | Hager et al. | |
| 5,564,656 | A | 10/1996 | Gilbert | |
| 5,636,848 | A | 6/1997 | Hager et al. | |
| 5,689,435 | A | 11/1997 | Umney et al. | |
| 5,768,149 | A | 6/1998 | Umney et al. | |
| 5,806,161 | A | 9/1998 | Schneider | |
| 5,821,412 | A | 10/1998 | Bryant et al. | |
| 6,062,062 | A | 5/2000 | Toida et al. | |
| 6,101,911 | A | 8/2000 | Newell et al. | |
| 6,114,773 | A | 9/2000 | Kouris | |
| 6,148,518 | A | 11/2000 | Weiner et al. | |
| 6,148,533 | A | 11/2000 | Hutter | |
| 6,341,419 | B1 | 1/2002 | Forrester et al. | |
| 6,452,179 | B1 | 9/2002 | Coates et al. | |
| 6,473,794 | B1 | 10/2002 | Guheen et al. | |
| 6,482,094 | B2 | 11/2002 | Kefes | |
| 6,484,574 | B1 | 11/2002 | Douglas et al. | |
| 6,519,571 | B1 | 2/2003 | Guheen et al. | |
| 6,563,074 | B2 | 5/2003 | Bazukuri et al. | |
| 6,817,108 | B2 * | 11/2004 | Eaton | 33/503 |
| 6,898,547 | B1 | 5/2005 | DeBlois et al. | |
| 7,090,464 | B2 | 8/2006 | Henning et al. | |
| 7,175,342 | B2 | 2/2007 | Tanaka et al. | |
| 7,539,594 | B2 | 5/2009 | Lee et al. | |
| 7,565,257 | B2 | 7/2009 | Lee | |
| 7,640,674 | B2 * | 1/2010 | Ferrari et al. | 33/502 |
| 7,665,219 | B2 * | 2/2010 | Styles et al. | 33/503 |
| 7,890,292 | B2 | 2/2011 | Jacquot | |
| 8,219,353 | B2 | 7/2012 | Lee et al. | |
| 8,336,223 | B2 * | 12/2012 | Nakayama et al. | 33/550 |
| 8,474,150 | B2 * | 7/2013 | Groell | 33/558 |
| 8,538,725 | B2 | 9/2013 | Lee et al. | |
| 8,567,084 | B2 * | 10/2013 | Ogihara et al. | 33/553 |
| 2002/0122583 | A1 | 9/2002 | Thompson | |
| 2004/0027562 | A1 | 2/2004 | Otsuka et al. | |
| 2004/0073338 | A1 | 4/2004 | Kobi | |
| 2005/0234576 | A1 | 10/2005 | Lee | |
| 2006/0010686 | A1 | 1/2006 | Henning et al. | |
| 2006/0114469 | A1 | 6/2006 | Horvath et al. | |
| 2007/0014660 | A1 | 1/2007 | Lee | |
| 2007/0258669 | A1 | 11/2007 | Lee | |
| 2009/0234481 | A1 | 9/2009 | Lee et al. | |
| 2009/0258669 | A1 | 10/2009 | Nie et al. | |
| 2009/0293276 | A1 | 12/2009 | DeBlois et al. | |
| 2009/0320309 | A1 | 12/2009 | Lee | |
| 2010/0198553 | A1 | 8/2010 | Lee et al. | |
| 2012/0310595 | A1 | 12/2012 | Lee et al. | |
| 2014/0157861 | A1 * | 6/2014 | Jonas et al. | 73/1.79 |

OTHER PUBLICATIONS

Axiam Incorporated Product Brochure of Axiam's Rotor Assembly Process, Tools & Training, "Build Engine Rotors Within Compliance Reduce Turn Time, Decrease Vibration and Cut Costs" (1991).

Merriam Webster's online dictionary, http://www.meriam-webster.com/dictionary/dimensions, p. 1.

* cited by examiner

TOTAL NUMBER N OF RADIUS MEASUREMENTS $$R = \frac{1}{N}\sum_{i=1}^{N}\sqrt{r_i^2 + \frac{N^2}{4\pi^2}(r_i^2 - 2r_i r_{i-1} + r_{i-1}^2)} \quad (1)$$

$$r_i = r_{Ai} + \Delta r_{Gi} + \Delta r_{Ti} + e_i \quad (2)$$

FIG. 3

$$r_i = \sqrt{y_i^2 + r'^2_i} \quad (3)$$

$$e_i = \sqrt{r'^2_i + y_i^2} - r'_i \quad (4)$$

ABSOLUTE DIAMETER MEASUREMENT ARM

RELATED APPLICATION(S)

This application is a continuation-in-part of U.S. application Ser. No. 14/010,197, filed Aug. 26, 2013 which is a continuation of U.S. application Ser. No. 13/491,035, filed Jun. 7, 2012, now U.S. Pat. No. 8,538,725, which is a continuation of U.S. application Ser. No. 12/695,304, filed Jan. 28, 2010, now U.S. Pat. No. 8,219,353, which claims the benefit of U.S. Provisional Application No. 61/148,857, filed on Jan. 30, 2009. The entire teachings of the above applications are incorporated herein by reference.

BACKGROUND OF THE INVENTION

In assembly of rotary machines, such as gas turbine engines, many measurements of parts are taken to determine assembly orientation to minimize vibration and run-out. Typical measurement apparatuses are capable of performing only relative measurements, such as eccentricity and roundness. U.S. Pat. Nos. 8,219,353 and 8,538,725 (both by assignee and herein incorporated by reference) provide apparatuses and methods for performing absolute diameter measurements.

SUMMARY OF THE INVENTION

In apparatus such as described in U.S. Pat. Nos. 8,219,353 and 8,538,725, significant calibrations of the apparatus are required to take into account any imperfections in a horizontal measurement arm and a tower to which the arm is attached. Thus, certain physical aspects/behavior of the horizontal measurement arm and the tower on which it is mounted are measured and calibrated. Based on the calibration, the effect of movements of the measurement arm on a probe end of the measurement arm are predicted.

In contrast to the '353 and '725 patents, embodiments of the present invention locate and/or measure a probe end of the measurement arm directly. Thus, the effect of tower and measurement arm imperfections on the probe end of the measurement arm are measured directly instead of being predicted based on calibration. Therefore, embodiments of the present invention can greatly simplify any necessary calibration, and can perform more accurate measurements of subject parts.

Embodiments of the present invention perform calibration steps that improve the accuracy of measurements and then use the higher-accuracy measurements of a part to compute the part's absolute diameter. Embodiments of the present invention can account for error caused by temperature changes, movements of measurement apparatus parts, and unavoidable alignment imprecision between parts of the measurement apparatus.

In one embodiment, an apparatus and corresponding method for measuring absolute diameter of an object on a rotary table includes a stable base with a substantially flat surface, the base having vibration-isolating mounts to isolate the stable base from ambient vibrations. The apparatus also includes a precision rotary table mounted to the flat surface of the stable base and a support tower mounted to the flat surface of the stable base, the tower being substantially perpendicular to the flat surface. A horizontal measurement arm is mounted to the support tower substantially parallel to the flat surface and configured to move towards and away from a center line of rotation of the precision rotary table. The horizontal measurement arm is configured to measure a distance of a precision gauge head on a probe end of the horizontal measurement arm away from the center line of rotation. A tracker is also mounted to the stable base and is configured to obtain a position in three-dimensional space of the probe end of the horizontal measurement arm. A controller is configured to determine a measurement arm correction based on the tracked and obtained position of the probe end of the measurement arm; determine a plurality of corrected points by applying a measurement arm correction to each of a plurality of measured points, the measured points being measured by the horizontal measurement arm (probe) around a circumference of a subject object on the rotary table, and the measurement arm correction being based upon the position in three-dimensional space of the probe end of the measurement arm; and determine an absolute radius of the object by applying the plurality of corrected points in a multi-point polygon model.

In some embodiments, the tracker is a laser tracker. The vibration-isolating mounts can be rubber bushings, air suspension mounts, or a spring suspension. The controller can be further configured to determine the plurality of corrected points by applying a thermal expansion correction to each of the plurality of measured points, and the thermal expansion correction can be based on one or more measured temperatures of the horizontal measurement arm. The controller can further be configured to determine the plurality of corrected points by applying a calibration correction to each of the plurality of measured points, the calibration correction being based on a difference between a known radius of a test object and a measured radius of the test object. The multi-point polygon model used by the computer controller can be a least-squares best-fit model.

In another embodiment, a method of determining absolute diameter of an object on a rotary table includes having an assembly formed of (i) a rotary table on a base, and (ii) a support tower on the base and carrying a horizontal measurement arm with a measurement probe end. The method also includes tracking the measurement probe end of the horizontal measurement arm to obtain a position in three-dimensional space of the measurement probe end of the horizontal measurement arm. The method further includes measuring a plurality of points around a circumference of a subject object on the rotary table using the horizontal measurement arm. For each measured point, a respective corrected point is determined by applying a measurement arm correction to the measured point, the measurement arm correction being based on the tracked and obtained position of the probe end of the horizontal-measurement arm. The determined corrected points are applied in a multi-point polygon model and absolute diameter of the subject object is determined.

Tracking the measurement probe end can include tracking with a laser tracker. The method can further include measuring a temperature of the horizontal measurement arm at each of the plurality of points around the circumference of the subject object, and determining the respective corrected point can include applying a thermal expansion correction based on the measured temperature at each respective point. The horizontal measurement arm can be calibrated by measuring a test object of known radius on the rotary table using the horizontal measurement arm. Determining the respective corrected point can further include applying an arm calibration correction equal in magnitude to a difference between a measured radius of the test object and the known radius. Determining the absolute diameter can include employing the multi-point polygon mathematical model to provide a radius.

In yet another embodiment, a method and corresponding apparatus for calibrating measurements by a horizontal measurement arm includes using a high precision rotary table on a base, wherein a support tower on the base carries the horizontal measurement arm, and a tracker is configured to track a measurement probe end of the horizontal measurement arm to obtain a position in three-dimensional space of the measurement probe end of the horizontal measurement arm. The method also includes determining a measurement arm error based on the tracked and obtained position of the measurement probe end of the horizontal measurement arm. The determined measurement arm error is used to effectively measure a plurality of corrected points around a circumference of a subject object on the rotary table with the horizontal measurement arm such that an absolute radius of the subject object is able to be determined by applying the plurality of corrected points in a multi-point polygon model.

Effectively measuring the plurality of corrected points can include applying a thermal expansion correction based on temperature of the measurement arm measured at each of the plurality of points around the circumference of the subject object. Effectively measuring the plurality of corrected points can also include applying the calibration correction by correcting the measured points by an amount equal in magnitude to an absolute value of the difference between the measured radius and the known radius of the test object. The method can further include determining a calibration correction by measuring the radius of a test object with a known radius and calculating a difference between the measured radius and the known radius of the test object.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
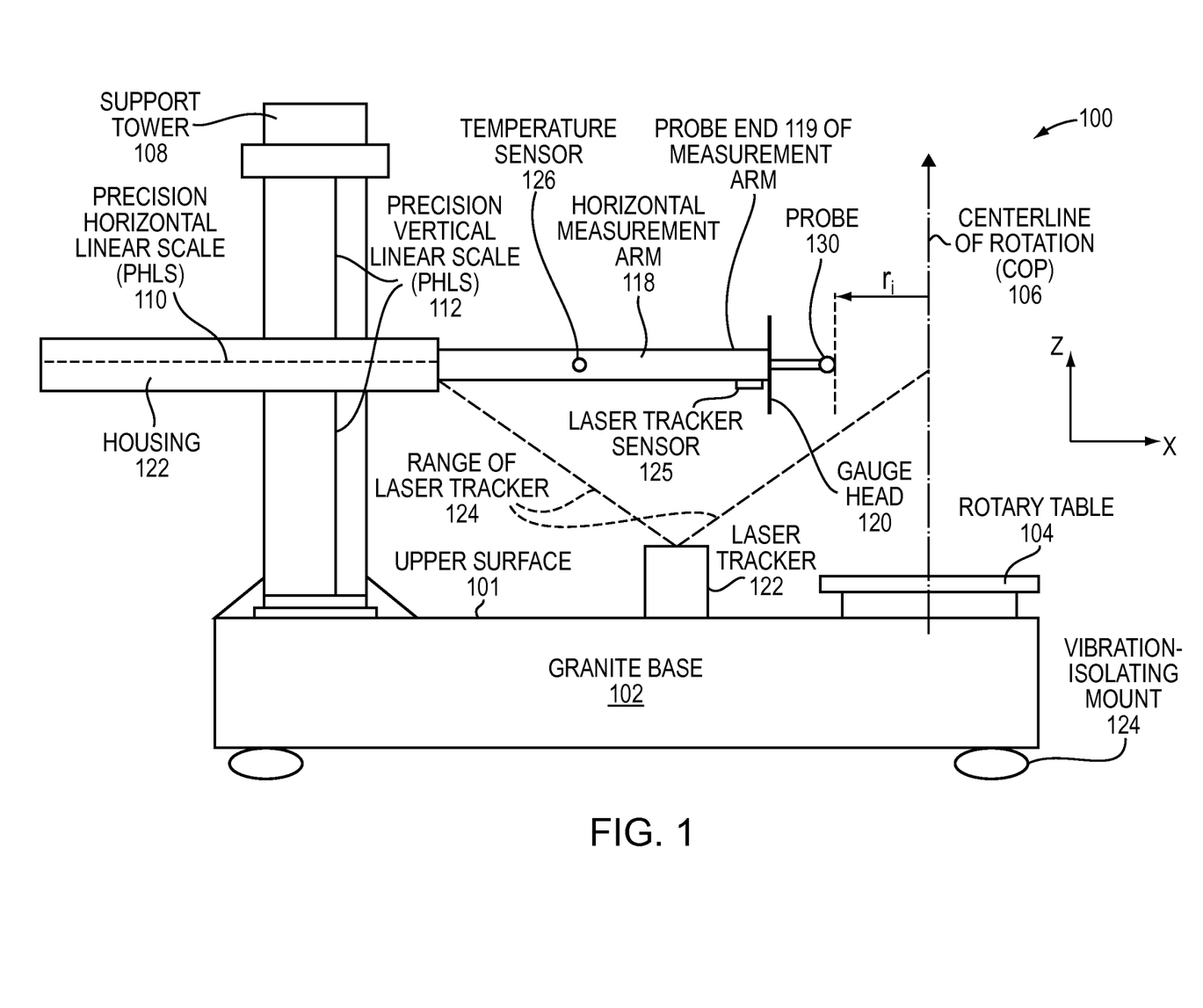
FIG. 1 is a side view of an absolute diameter measurement apparatus embodying the present invention.

FIG. 1 shows a measurement apparatus 100 according to an embodiment of the present invention. The measurement apparatus 100 includes a base 102 preferably made out of granite. Granite is heavy and insensitive to thermal changes, thereby providing a stable platform on which measurements may be performed. Granite is also easy to precisely mill to provide a nearly-perfect flat and level upper surface 101 on which to perform the measurements. A person having ordinary skill in the art understands that other materials also may provide an acceptable base 102 with level upper surface 101 for the measurement apparatus.

The granite base 102 is mounted to a vibration-isolating mount 124 to isolate the base 102 from ambient shop vibrations. The vibration-isolating mounts 124 are shown in conceptual form in FIG. 1. A person having ordinary skill in the art understands that there are many ways to incorporate vibration-isolating mounts 124 in the installation of the measurement apparatus 100, and that the vibration-isolating mounts 124 may take many different forms, such as rubber pads, air suspension, or a spring suspension.

A high-precision rotary table 104 and high-stiffness support tower 108 are mounted to the level upper surface 101 of the granite base 102. The high-precision rotary table 104 supports parts being measured (not shown). The high-stiffness support tower 108 carries a precision horizontal linear scale (PHLS) 110 and a high-stiffness horizontal arm 118. The high-stiffness horizontal arm 118 has a known length L, which is known to a high degree of precision. The PHLS 110 and high-stiffness horizontal arm 118 positionally move along a vertical (or along a longitudinal) axis of the high-stiffness support tower 108. The PHLS 110 measures the horizontal position of high-stiffness horizontal arm 118, which moves laterally or horizontally, i.e., at a right angle, to the high-stiffness support tower 108. The PHLS 110 is typically measuring the distance from a gauge head 120, mounted to the distal (or measurement) end 119 of the high-stiffness horizontal arm 118, from the centerline of rotation 106 of the high-precision rotary table 104. The gauge head 120 may be configured to measure either an interior surface diameter or an exterior surface diameter of a subject part positioned on rotary table 104. A person having ordinary skill in the art understands that the precision horizontal scale 110 may measure a different distance, e.g., a distance of the gage head 120 from a surface of the housing 122.

Gage heads, such as gage head 120, typically make contact with an object, e.g., subject part, being measured. The gage heads are typically capable of deflection to avoid transmitting forces to the object being measured. Such gage heads are usually high precision, and the position of the gage head and any deflection are known to a very high degree of accuracy. There are many types of precision gage heads available that are known to persons having ordinary skill in the art, any of which are suitable for use in the measurement arm 118 described herein. For the purposes of the measurement arm 118 described herein, the gage head 120 is assumed to be a part of the horizontal measurement arm 118 and to have no deflection.

The high-stiffness support tower 108 also carries a precision vertical linear scale (PVLS) 112, which measures the height of housing 122 and high-stiffness horizontal arm 118 above the upper planar surface 101 of the granite base 102 (or above the surface of a base made of a different material).

The device shown in FIG. 1 differs from the devices shown in previous U.S. Pat. Nos. 8,219,353 and 8,538,725 in the method for correcting measurement errors. In the previous patents, a laser was mounted at the granite base 102 to measure displacement of the horizontal arm housing 122 and high-stiffness horizontal arm 118. The housing 122 and high-stiffness horizontal arm 118 can displace, i.e., shift, perpendicular to the longitudinal axis of the high-stiffness support tower 108 as they move vertically on the high-stiffness support tower 108 for two reasons: displacement of the high-stiffness support tower 108 away from the parallel axis, i.e., tower sway, and imperfections in the surface of the high-stiffness support tower 108. The previous patents used laser measurements of tower sway and imperfections, and through a series of calibrations, it was possible to predict the effect of sway and imperfections on the measurements performed at the probe end 119 of the measurement arm 118.

In contrast to the previous U.S. Pat. Nos. 8,219,353 and 8,538,725, embodiments of the present invention measure the effect of tower and arm imperfections directly at the probe end 119 of the measurement arm 118. FIG. 1, for example, shows a laser tracker 122 mounted to the granite base 102. The laser tracker 122 measures one or more coordinate positions in three-dimensional space of the probe end 119 of the measurement arm. The laser tracker 122 has an angular range 124 in which it can direct a laser beam to a laser tracker sensor 125 mounted at or near the probe end 119 of the measurement arm. The laser tracker sensor 125 outputs a signal to sensor electronics (not shown), which can provide to a processor one or more coordinate positions in three-dimensional space of the probe end 119. Of primary importance is the x (or in-plane radial) position, which can be used to correct measurements of radius of a subject object on the rotary table 104. However, the laser tracker 122 can also measure coordinates in three dimensions, and the additional coordinate positions can also be used to correct radial measurements, as illustrated later in conjunction with FIG. 4.

An optional temperature sensor 126 is also shown in FIG. 1. The temperature sensor 126 is embedded into the measurement arm 118 and can measure a temperature of the horizontal measurement arm 118 for each radius measurement obtained by the horizontal measurement arm 118. These temperature measurements can be used then to correct the measured radii for thermal expansion of the measurement $r_i$ arm, for example. The temperature sensor 126 is optional because the laser tracker 122 measurements of the probe end 119 of the measurement arm will include much of the effect of thermal expansion of the measurement arm 118. Thus, correction for thermal expansion may be sufficiently included in the effect of the laser tracker 122 measurements and corresponding corrections.

Figure 2A:
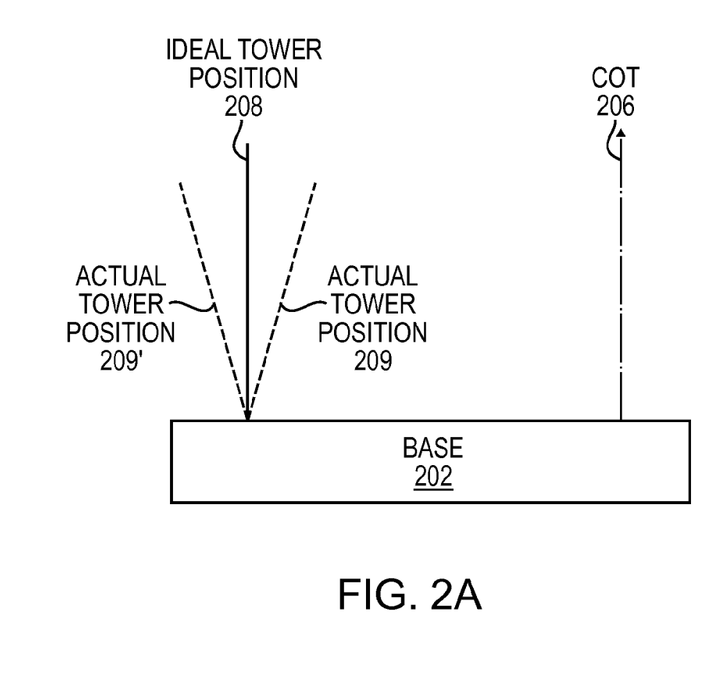
FIG. 2A is a conceptual drawing showing support tower lean.
Figure 2B:
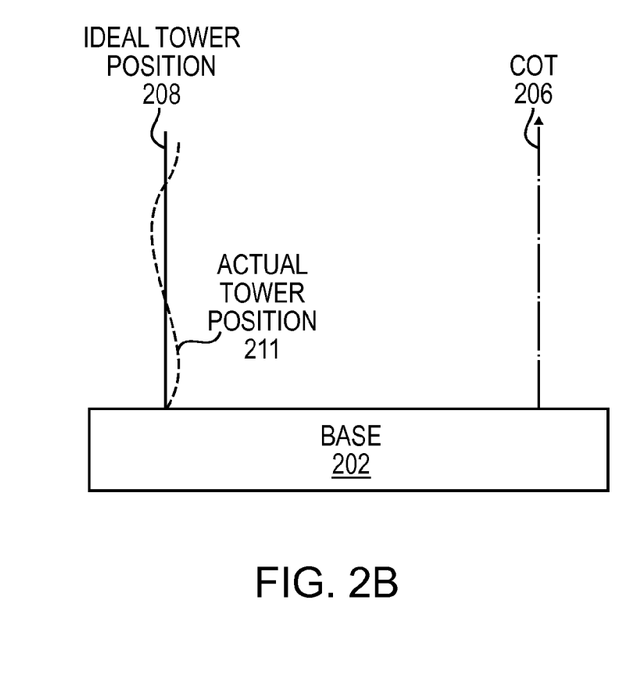
FIG. 2B is a conceptual drawing showing support tower variance.

FIGS. 2A and 2B illustrate these two reasons for perpendicular displacement of the housing 122 and high-stiffness horizontal arm 118 from FIG. 1. FIG. 2A shows a base 202 and a centerline of rotation 206 of a high-precision rotary table (not shown) and an ideal tower position 208. The ideal tower position 208 is perfectly parallel to the centerline of rotation 206. However, the tower (such as tower 108) will deflect by a small amount due in part to the tower 108 not being perfectly perpendicular to the base 202 and due to the weight of the housing 122 (not shown) and high-stiffness horizontal arm 118 (not shown) exerting a bending moment on the tower. Thus, the actual tower is not perfectly parallel to the centerline of rotation 206 and is a displaced tower (generally position referenced displacement 209). Generally, the higher the housing (not shown) and high-stiffness horizontal arm (not shown) move up (away from base surface 101) along the high-stiffness support tower 108, the greater the high-stiffness support tower 108 will deflect from ideal position 208. Note that the actual tower displacement 209 is shown greatly exaggerated for illustration purposes. Further note that the actual tower displacement 209 may be in a different direction, such as displacement 209'.

FIG. 2B shows a base 202 and a centerline of rotation 206 of a high-precision rotary table (not shown) and an ideal tower position 208. Again, the ideal tower position 208 is perfectly parallel to the centerline of rotation 206. However, the tower will have small variances caused by manufacturing imperfections. FIG. 2B illustrates an actual tower position 211 that is different from the ideal tower position 208. The tower variance 211 is shown greatly exaggerated for illustration purposes.

The errors illustrated in FIGS. 2A and 2B are the types of errors whose effect the laser tracker 122 in FIG. 1 can measure directly, greatly simplifying any calibration required for the system.

Figure 3:
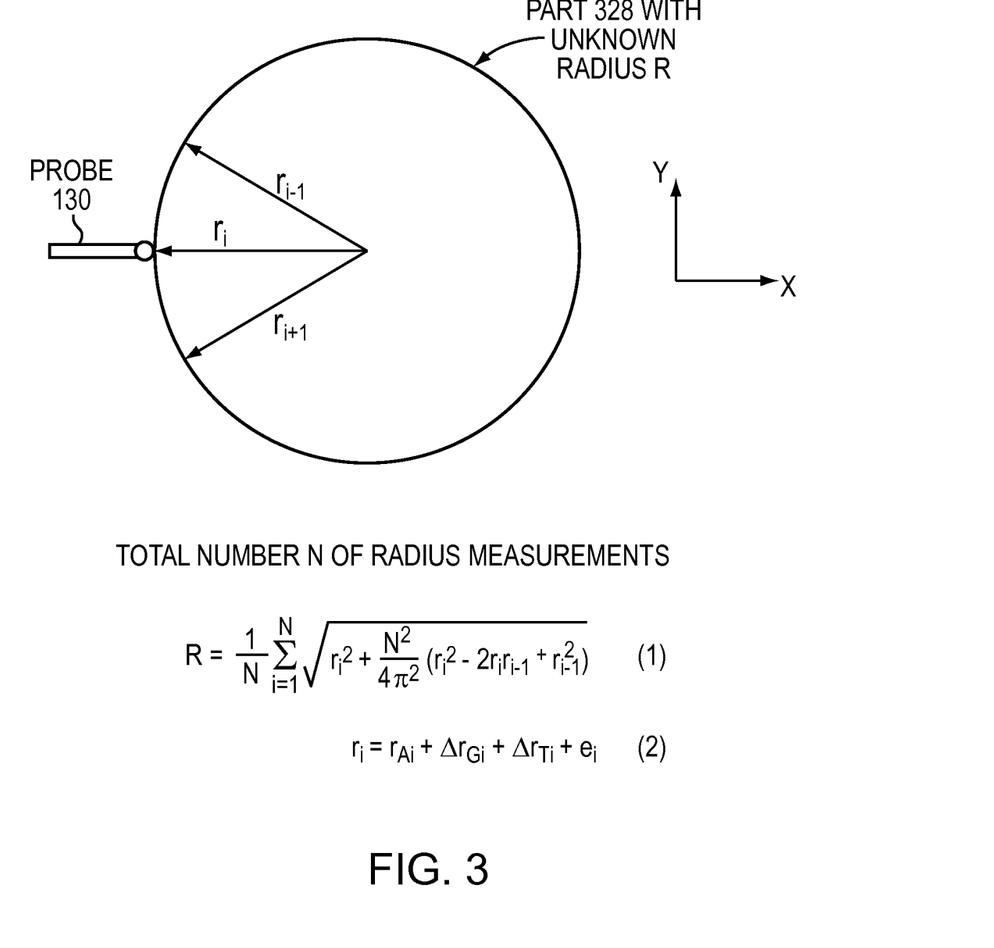
FIG. 3 is a conceptual drawing showing various radial measurements performed on a part and an equation for a best estimate of measured radius.

FIG. 3 illustrates radius measurements performed on a subject part 328 with unknown radius R. The probe 130 mounted to the probe end 119 of the measurement arm shown in FIG. 1 contacts the part 328 to obtain measurements $r_i$ of the radius of the part 328 as the part is rotated on the rotary table 104 shown in FIG. 1. Several of these measurements are shown in FIG. 3, including the current measurement $r_i$, the previous measurement $r_{i-1}$, and the next measurement $r_{i+1}$. Many of these radial measurements can be obtained to produce a best estimate for radius R or diameter of the part 328, and typically thousands of these measurements are obtained to calculate the best estimate for radius R (and hence diameter, which is twice the radius).

FIG. 3 also shows equations that can be used to obtain a best estimate radius R for the part 328:

$$R = \frac{1}{N}\sum_{i=1}^{N}\sqrt{r_i^2 + \frac{N^2}{4\pi^2}(r_i^2 - 2r_i r_{i-1} + r_{i-1}^2)} \qquad (1)$$

$$r_i = r_{Ai} + \Delta r_{Gi} + \Delta r_{Ti} + e_i \qquad (2)$$

The individual radius measurements $r_i$ are combined into a multi-point polygon model, such as the least squares best fit model. The least squares best fit model outputs the absolute radius (or absolute diameter, which is the absolute radius multiplied by two) of the subject part 328. Equation (1) shown in FIG. 3 is an example of such an equation based on a least squares best fit model. N is the total number of individual radius measurements taken.

Once all radius measurements $r_i$ are obtained, the measurements can be input into Equation (1) to obtain the best estimate for measured radius R. The apparatus of FIG. 1 obtains the individual measurements $r_i$ according to Equation (2) shown in FIG. 3. The value $r_{Ai}$ is the radius measurement obtained by the horizontal measurement arm 118 based on the PHLS 110, shown in FIG. 1. Each value $\Delta r_{Gi}$ is a change in radius obtained from the gauge head probe 130. Each value $\Delta r_{Ti}$ is a change in horizontal measurement arm position based on the tracking laser 122 and for laser tracker sensor 125 shown in FIG. 1. The values $e_i$ are corrections that can be applied to the radius if the probe 130 is not perfectly directed toward the center of the subject part 328. In other embodiments, a temperature correction can be applied to the radius measurements $r_i$ shown in Equation (2). The temperature corrections can be based on temperatures of the horizontal measurement arm measured for each radius $r_i$ using the temperature sensor 126 shown in FIG. 1. Temperature corrections can also be based on a coefficient of thermal expansion of the horizontal measurement arm 118. Further, in other embodiments, the temperature of the horizontal measurement arm 118 may be measured using non-contact temperature measurement.

The arm radius measurement $r_{Ai}$ can be based on a calibrated horizontal measurement arm 118. The horizontal measurement arm 118 in FIG. 1 is calibrated using a part of known radius (not shown) to produce correct values for $r_{Ai}$, $\Delta r_{Gi}$, and $\Delta r_{Ti}$. A part of known radius (not shown) is placed on the rotary table 104, and the horizontal measurement arm 118 is extended so that the probe 130 contacts the part of known radius. Upon contact, positions of the horizontal measurement arm 118, the probe 130, and the laser tracker sensor 125 are set appropriately. Namely, the horizontal measurement arm 118 position is set to the known radius for the known part, and the positions for the probe 130 and for the laser tracker sensor 125 are set to zero.

After measurement arm calibration, the part of known radius is removed from the rotary table 104, and the subject part 328 of unknown radius R is placed on the rotary table 104. Thereafter, when radius measurements on the unknown subject part 328 are taken, the horizontal measurement arm 118 reports an absolute radius measurement $r_{Ai}$ that is calibrated based on the known part. The probe 130 reports a value $\Delta r_{Gi}$ that represents any change in the value of the probe position since coming into contact with the known part during calibration. Similarly, the laser tracker sensor 125 reports a position $\Delta r_{Ti}$ that represents any difference between the laser tracker position measured at the known part during calibration and the unknown part during measurements of $r_i$. Error measurements $e_i$ as seen in Equation (2) can be obtained as shown in FIG. 4.

Figure 4:
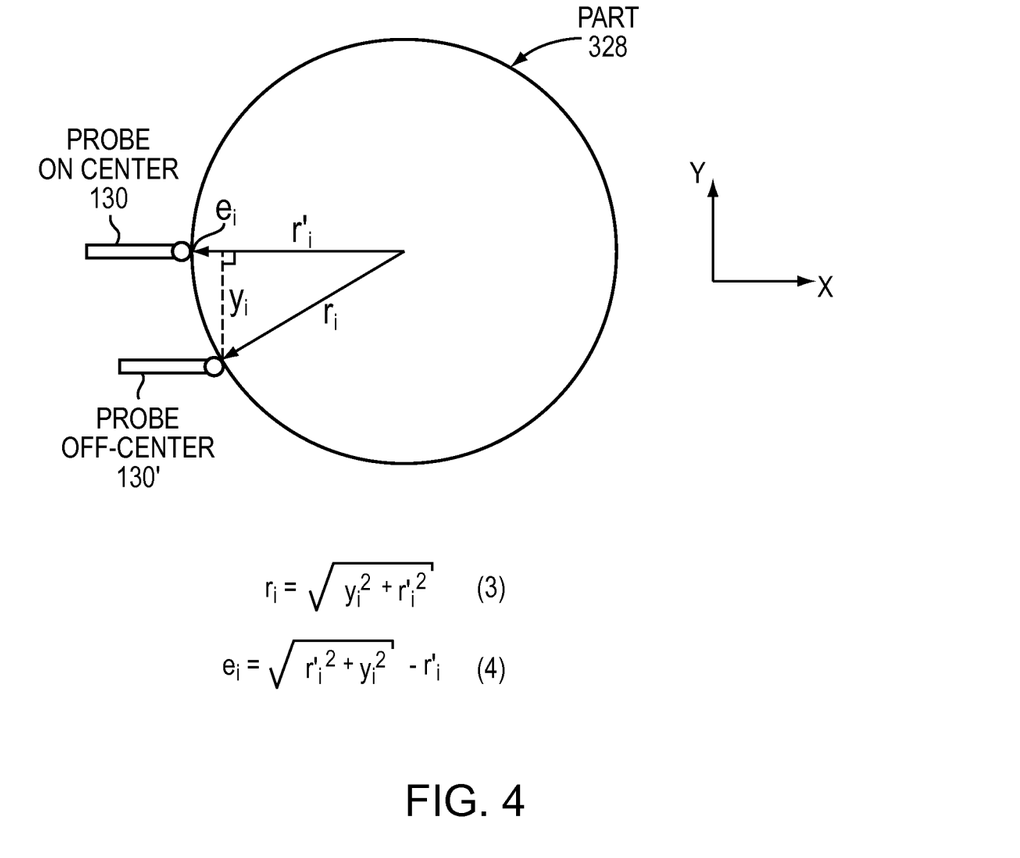
FIG. 4 includes a conceptual drawing and equation showing how a y-direction error in radial measurement can be corrected.

FIG. 4 illustrates the effect that can occur if the probe 130 is not directed perfectly toward the center of the known part 328. The difference between the positions of the on center probe 130 and the off-center probe 130' is exaggerated for illustration purposes. The probe 130 is on center or directed radially toward the part 328, and it measures a correct value $r_i$ for radius. In contrast, the probe 130' is off-center, and it reports an incorrect value $r_i'$ for radius. The difference between $r_i'$ and $r_i$ is the error $e_i$. The value $y_i$ is the distance between the radius $r_i'$ and the position where the probe 130' contacts the edge of the part 328 along a line perpendicular to the radius $r_i'$. The value $y_i$ can be obtained from the laser tracker sensor 125 in a way similar to how the radial measurement $\Delta r_{Gi}$ is obtained from the laser tracker sensor 125. It can be shown that:

$$r_i = \sqrt{y_i^2 + r_i'^2} \quad (3)$$

$$e^i = \sqrt{r_i'^2 + y_i^2} - r_i' \quad (4)$$

The error correction $e_i$ shown in Equation (4) can be calculated and applied to Equation (2) in FIG. 3 to correct for any horizontal displacement along the y-axis of the probe 130.

Corrections to the radial measurements $r_i$ are not limited to the x and y axes. The laser tracker 122 can obtain height measurements for the laser tracker sensor 125 in the z direction shown in FIG. 1. Thus, corrections to the radial measurements $r_i$ due to any z direction displacement of the probe end 119 of the measurement arm can be made to the radial measurements $r_i$ in a similar way to that in which y-direction corrections are obtained as shown in FIG. 4.

In addition to the corrections shown in FIG. 4, a thermocouple measures the temperature of the high-stiffness horizontal measurement arm 118 during the measurement of the 2,000 radii measurements $r_i$. A length correction can be applied to each of the 2,000 points $r_i$ by calculating the change in temperature from a starting temperature and multiplying the change in temperature by a known coefficient of expansion of the material from which the high-stiffness horizontal measurement arm 118 is made. However, in some embodiments, temperature corrections are not necessary because the effect of thermal expansion of the horizontal measurement arm 118 is adequately accounted for by the laser tracer sensor 125.

Figure 5:
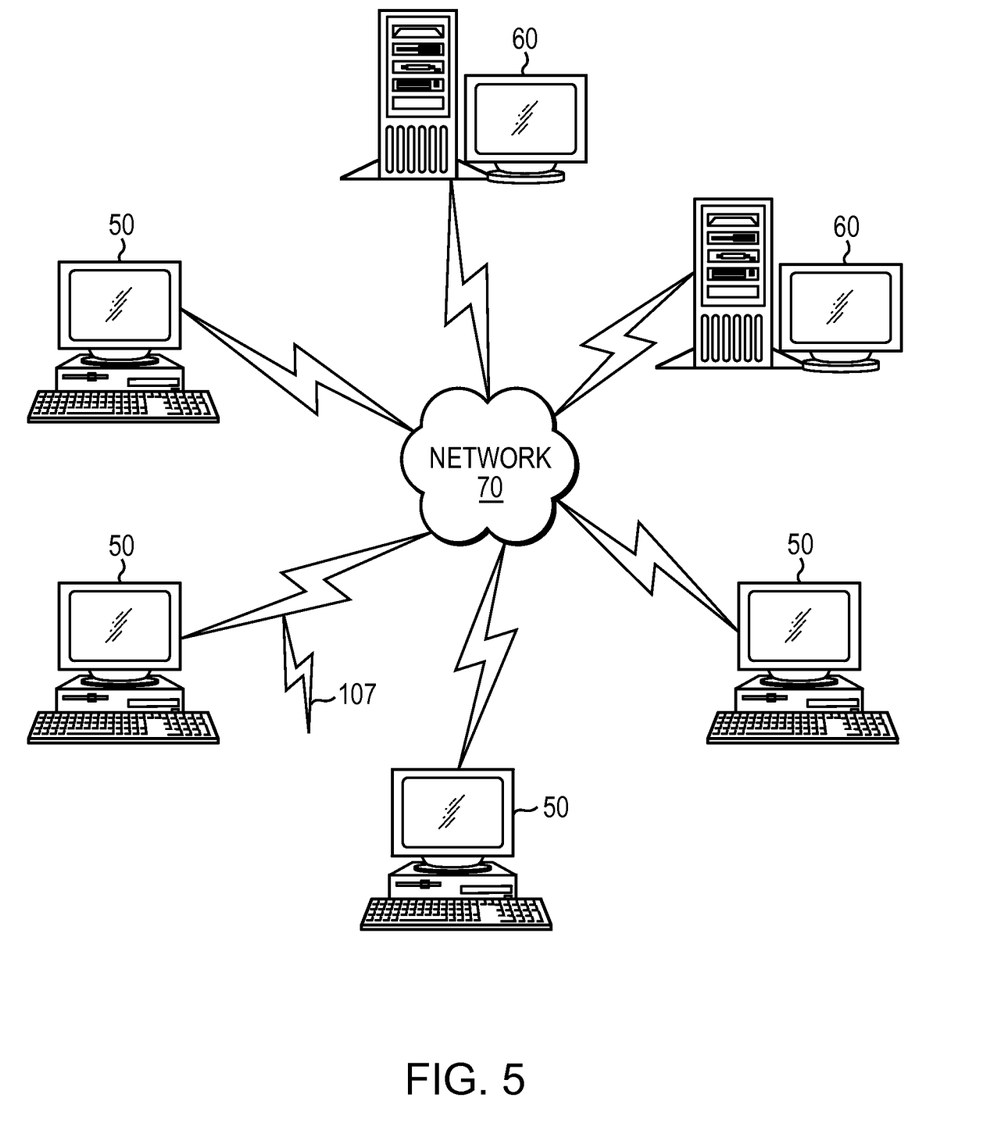
FIG. 5 is a schematic view of a computer network in which embodiments are deployed.

FIG. 5 illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
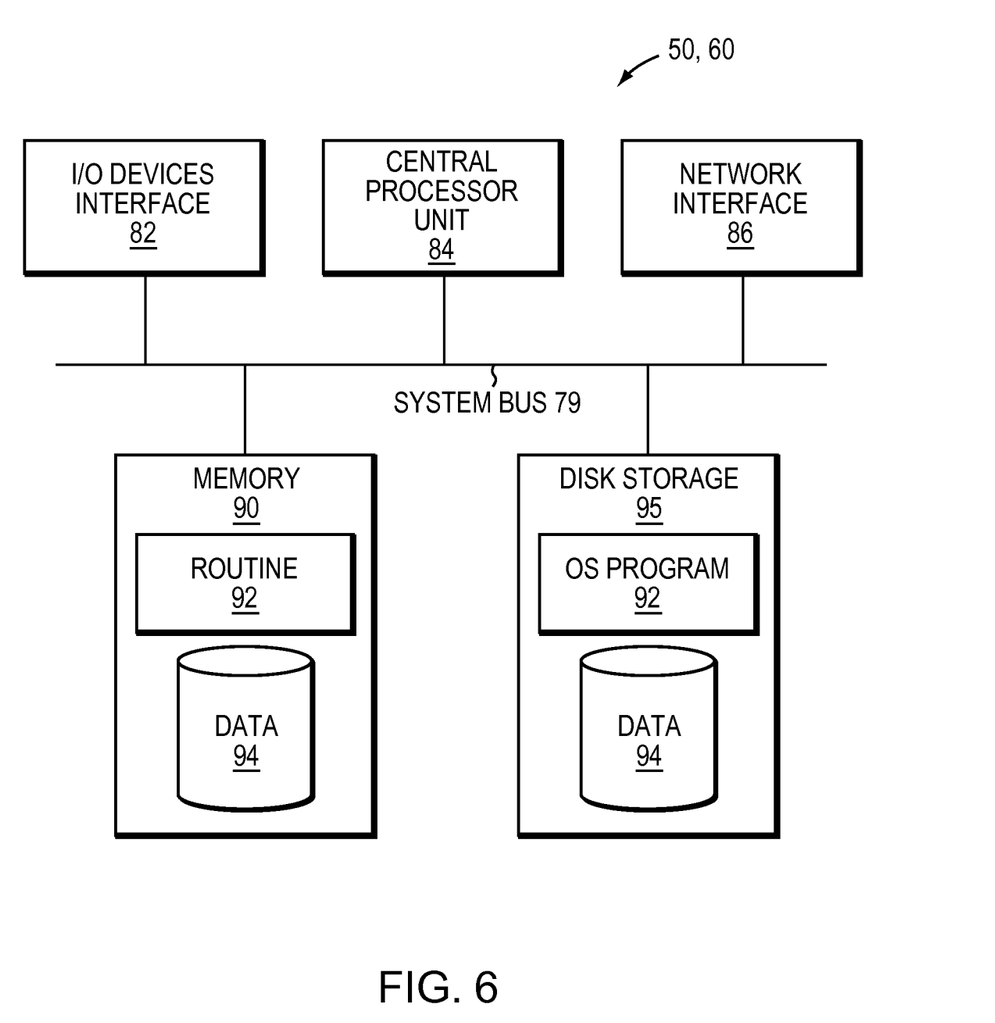
FIG. 6 is a block diagram of a computer node in the network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., error measurement code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of determining absolute diameter of an object on a rotary table, comprising:
    having an assembly formed of (i) a rotary table on a base, and (ii) a support tower on the base and carrying a horizontal measurement arm with a measurement probe end, tracking the measurement probe end of the horizontal measurement arm to obtain a position in three-dimensional space of the measurement probe end of the horizontal measurement arm;
    using the horizontal measurement arm, measuring a plurality of points around a circumference of a subject object on the rotary table;
    for each measured point, determining a respective corrected point by applying a measurement arm correction to the measured point, the measurement arm correction being based on the tracked and obtained position of the measurement probe end of the measurement arm; and
    applying the determined corrected points in a multi-point polygon model and determining absolute diameter of the subject object.

2. The method of claim 1 wherein tracking the measurement probe end comprises tracking with a laser tracker.

3. The method of claim 1, further including measuring a temperature of the horizontal measurement arm at each of the plurality of points around the circumference of the subject object, and wherein determining the respective corrected point comprises applying a thermal expansion correction based on the measured temperature at each respective point of the plurality of measured points.

4. The method of claim 1, further comprising calibrating the horizontal measurement arm by measuring a test object of known radius on the rotary table using the horizontal measurement arm.

5. The method of claim 4, wherein determining the respective corrected point further comprises applying an arm calibration correction equal in magnitude to a difference between a measured radius of the test object and the known radius.

6. The method of claim 1 where determining the absolute diameter comprises employing the multi-point polygon mathematical model to provide a radius.

7. The method of claim 6 wherein the multi-point polygon model is a least squares best fit model.

8. A method of calibrating measurements by a horizontal measurement arm, comprising:
    given a high precision rotary table on a base, a support tower on the base carrying a horizontal measurement arm, and a tracker configured to track a measurement probe end of the horizontal measurement arm to obtain a position in three-dimensional space of the measurement probe end of the horizontal measurement arm;
    determining a measurement arm error based on the tracked and obtained position of the measurement probe end of the horizontal measurement arm;
    using the determined measurement arm error to effectively measure a plurality of corrected points around a circumference of a subject object on the rotary table with the horizontal measurement arm such that an absolute radius of the subject object is able to be determined by applying the plurality of corrected points in a multi-point polygon model.

9. The method of claim 8, wherein the tracker is a laser tracker.

10. The method of claim 8, further including measuring a temperature of the horizontal measurement arm at each of the plurality of points around the circumference of the subject object, and wherein effectively measuring the plurality of corrected points further comprises applying a thermal expansion correction based on the measured temperature at each respective point of the plurality of measured points.

11. The method of claim 8, further comprising determining a calibration correction by measuring the radius of a test object with a known radius and calculating a difference between the measured radius and the known radius of the test object.

12. The method of claim 11, wherein effectively measuring the plurality of corrected points further comprises applying the calibration correction by correcting the measured points by an amount equal in magnitude to an absolute value of the difference between the measured radius and the known radius of the test object.

13. The method of claim 8, wherein the multi-point polygon model is a least-squares best-fit model.

14. An apparatus for measuring absolute diameter of an object on a rotary table, comprising:
    a stable base with a substantially flat surface, the base including vibration-isolating mounts to isolate the stable base from ambient vibrations;
    a precision rotary table mounted to the flat surface of the stable base;
    a support tower mounted to the flat surface of the stable base, the support tower substantially perpendicular to the flat surface;
    a horizontal measurement arm mounted to the support tower substantially parallel to the flat surface and configured to move towards and away from a centerline of rotation of the precision rotary table, the horizontal measurement arm configured to measure a distance of a precision gauge head on a probe end of the horizontal measurement arm from the centerline of rotation;
    a tracker mounted to the stable base and configured to obtain a position in three-dimensional space of the probe end of the horizontal measurement arm; and
    a controller configured to:
        i) determine a measurement arm correction based on the tracked and obtained position of the probe end of the measurement arm;
        ii) determine a plurality of corrected points by applying a measurement arm correction to each of a plurality of measured points, the measured points being measured by the horizontal measurement arm around a circumference of a subject object on the rotary table, and the measurement arm correction being based upon the position in three-dimensional space of the probe end of the measurement arm; and
        iii) determine an absolute radius of the object by applying the plurality of corrected points in a multi-point polygon model.

15. The apparatus of claim 14, wherein the tracker is a laser tracker.

16. The apparatus of claim 14, wherein the controller is configured to determine the plurality of corrected points further by applying a thermal expansion correction to each of the plurality of measured points, the thermal expansion correction being based on one or more measured temperatures of the horizontal measurement arm.

17. The apparatus of claim 14, wherein the controller is configured to determine the plurality of corrected points by further applying a calibration correction to each of the plurality of measured points, the calibration correction being based on a difference between a known radius of a test object and a measured radius of the test object.

18. The apparatus of claim 17 wherein the multi-point polygon model used by the computer controller is a least-squares best-fit model.

19. The apparatus of claim 14 wherein the vibration-isolating mounts comprise at least one of rubber bushings, air suspension mounts, and a spring suspension.

\* \* \* \* \*